US008771380B2

(12) United States Patent
Bakkenes et al.

(10) Patent No.: US 8,771,380 B2
(45) Date of Patent: Jul. 8, 2014

(54) SODIUM CHLORIDE PRODUCTION PROCESS

(75) Inventors: Hendrikus Wilhelmus Bakkenes, Apeldoorn (NL); Johannes Albertus Maria Meijer, Schalkhaar (NL); Allert Schokker, Deventer (NL)

(73) Assignee: Akzo Nobel N.V., Arnhem (NL)

(*) Notice: Subject to any disclaimer, the term of this patent is extended or adjusted under 35 U.S.C. 154(b) by 695 days.

(21) Appl. No.: 13/055,185

(22) PCT Filed: May 22, 2009

(86) PCT No.: PCT/EP2009/056472
§ 371 (c)(1),
(2), (4) Date: Jan. 21, 2011

(87) PCT Pub. No.: WO2010/009933
PCT Pub. Date: Jan. 28, 2010

(65) Prior Publication Data
US 2011/0129409 A1    Jun. 2, 2011

Related U.S. Application Data

(60) Provisional application No. 61/083,443, filed on Jul. 24, 2008.

(30) Foreign Application Priority Data

Jul. 22, 2008  (EP) ..................................... 08160910

(51) Int. Cl.
*C01D 3/24*   (2006.01)
(52) U.S. Cl.
USPC ............................... 23/303; 23/296; 23/302 T
(58) Field of Classification Search
USPC ...................... 23/303, 295 R, 296, 298, 302 T
See application file for complete search history.

(56) References Cited

U.S. PATENT DOCUMENTS

| | | | |
|---|---|---|---|
| 2,622,115 A | 12/1952 | Carney | |
| 3,058,729 A | 10/1962 | Dahms et al. | |
| 3,655,333 A | 4/1972 | Stenger et al. | |
| 3,779,030 A | 12/1973 | Best | |
| 4,654,064 A | 3/1987 | Cheng et al. | |
| 6,267,789 B1 | 7/2001 | Ninante | |
| 6,428,583 B1 * | 8/2002 | Reuter | ............................. 23/301 |
| 7,141,219 B1 | 11/2006 | Klaren | |
| 2007/0207082 A1 | 9/2007 | Lee et al. | |

FOREIGN PATENT DOCUMENTS

| | | |
|---|---|---|
| DE | 1 037 429 | 8/1958 |
| DE | 69 607 610 | 6/2001 |
| FR | 2 866 870 | 9/2005 |
| GB | 979 963 | 1/1965 |
| GB | 1 009 736 | 11/1965 |
| GB | 1 087 476 | 10/1967 |
| GB | 1 240 667 | 7/1971 |
| WO | 96/25360 | 8/1996 |
| WO | 01/28958 | 4/2001 |

OTHER PUBLICATIONS

International Search Report and Written Opinion, PCT/EP2009/064247, mailed Mar. 16, 2010.
Reply to Written Opinion of the International Searching Authority, PCT/EP2009/064247, dated Aug. 4, 2010.
International Preliminary Report on Patentability, PCT/EP2009/064247, mailed Jan. 17, 2011.
Kaufmann, Dale W., Sodium Chloride, "The Production and Properties of Salt and Brine", Hafner Publishing Company, New York, 1968, p. 547.
Ninane, L., et al., "Purification of Rocksalt by a New Process at Low Temperature", Salt 2000, 8$^{th}$ World Symposium, vol. 1, pp. 451-458.
Pronk, P., et al., Chemical Engineering and Processing, "Prevention of Crystallization Fouling During Eutectic Freeze Crystallization in Fluidized Bed Heat Exchangers", vol. 47 (2008) 2140-2149.
Swenne, D. A., et al., "The Eutectic Crystallization of Sodium Chloride Dihydrate and Ice", J. Separ. Proc. Technol., 1985, vol. 6, pp. 17-25.
Kaufmann, Dale W., "Low Temperature Properties and Uses of Salt and Brine", Chapter 23 from Sodium Chloride: The Production and Properties of Salt and Brine, American Chemical Society, Monograph Series, 1960 Edition, pp. 547-568.
Habib, Boaz, et al., "Heat transfer and operating conditions for freeze concentration in a liquid-solid fluidized bed heat exchanger", Chemical Engineering and Processing, 2006, vol. 45, pp. 698-710.
Stepakoff, G. L., et al., "Development of a Eutectic Freezing Process for Brine Disposal", Desalination, 1974, vol. 14, pp. 25-38.
Seckler, M. M., et al., "Application of Eutectic Freeze Crystallization to Process Streams and Wastewater Purification", Eutectic Freeze Crystallization EETK97129 Project, pp. 1-14.
Avram, Daniel, et al., "Technologies for eutectic freeze crystallization", Rev. Chim. (Bucuresti), 2004, vol. 55, No. 10, pp. 769-772.
Swenne, D. A., "The Eutectic Crystallization of NaC1.2H$_2$0 and Ice", PhD Thesis, 1983, pp. 1-141.
Meewisse, J. W., "Fluidized Bed Ice Slurry Generator for Enhanced Secondary Cooling Systems", PhD Thesis, 2004, pp. 1-218.
Pronk, P., "Fluidized Bed Heat Exchangers to Prevent Fouling in Ice Slurry Systems and Industrial Crystallizers", PhD Thesis, 2006, pp. 1-262.

(Continued)

Primary Examiner — Edward Johnson
(74) Attorney, Agent, or Firm — Kenyon & Kenyon LLP

(57) ABSTRACT

The present invention pertains to a process for producing sodium chloride comprising the steps of (i) preparing a brine comprising at least 150 g/l of sodium chloride by dissolving a sodium chloride source in water, (ii) subjecting the resulting brine to a eutectic freeze crystallization step by indirect cooling of said brine, resulting in the formation of ice, sodium chloride dihydrate, and a mother liquor, (iii) separating the sodium chloride dihydrate formed in step (ii) from the ice and optionally mother liquor at the eutectic temperature, such that a sodium chloride dihydrate-rich stream is formed, and (iv) feeding said sodium chloride dihydrate-rich stream to a recrystallizer to form sodium chloride and a mother liquor.

14 Claims, 1 Drawing Sheet

(56) References Cited

OTHER PUBLICATIONS

Vaessen, R., "Development of Scraped Eutectic Crystallizers", PhD Thesis, 2006, pp. 1-164.
McCarthy, C., et al., Abstract in Proceedings of the International Conference on the Physics and Chemistry of Ice, 11$^{th}$, Bremerhaven, Germany, Jul. 23-28, 2006 (2007), pp. 391-398, Abstract Only.
International Search Report for PCT/EP2009/056472, dated Sep. 15, 2009, 3 pages.
Written Opinion of the International Searching Authority for PCT/EP2009/056472, dated Sep. 15, 2009, 5 pages.
Response to Written Opinion for PCT/EP2009/056472, dated Apr. 14, 2010, 3 pages.
International Preliminary Report on Patentability for PCT/EP2009/056472, dated Oct. 13, 2010, 5 pages.

\* cited by examiner

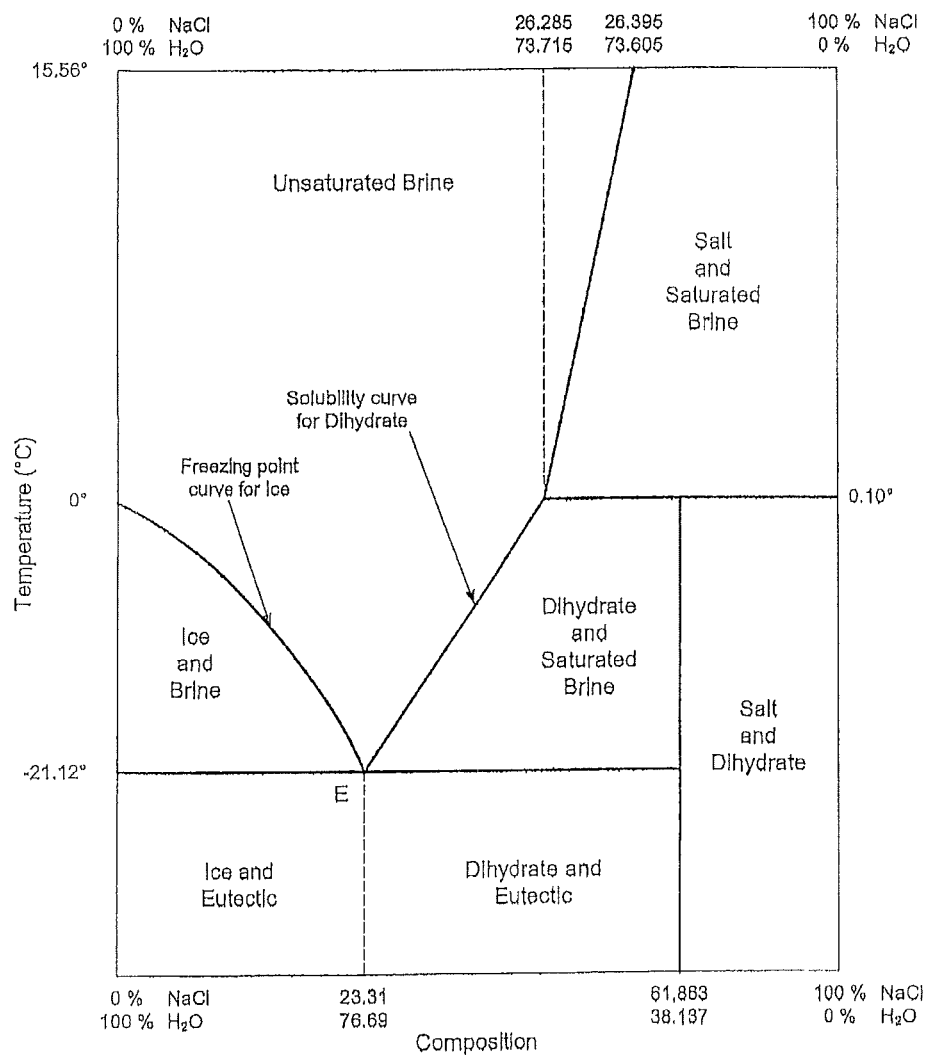
The system sodium chloride-water (Not to scale)

SODIUM CHLORIDE PRODUCTION PROCESS

REFERENCE TO RELATED APPLICATION(S)

This application is the U.S. National Phase of PCT/EP2009/056472 filed on May 29, 2009, and claims the benefit of U.S. Provisional Application No. 61/083,443 filed on Jul. 24, 2008.

The present invention relates to a novel sodium chloride production process.

Sodium chloride is made industrially from aqueous solutions produced by dissolving a natural source of the sodium chloride in water. The sodium chloride is usually obtained by crystallizing it from the aqueous sodium chloride solution by evaporation of the water, which is generally accomplished using multiple-effect or vapour recompression evaporators. Multiple-effect systems typically contain three or more forced-circulation evaporating vessels connected in series. The steam produced in each evaporator is fed to the next one in the multiple-effect system to increase energy efficiency. Mechanical vapour recompression forced-circulation evaporators consist of a crystallizer, a compressor, and a vapour scrubber. The aqueous sodium chloride solution (brine) enters the crystallizer vessel, where salt is crystallized. Vapour is withdrawn, scrubbed, and compressed for reuse in the heater.

Both recompression evaporators and multiple-effect evaporators are energy-intensive because of the water evaporation step involved. Furthermore, brine produced by dissolving a natural sodium chloride source in water normally contains a quantity of major contaminations. Said contaminations in brine obtained from a natural source comprise in al. potassium, bromide, magnesium, calcium, strontium, and sulphate ions. For many applications, such as in the chemical transformation industry (e.g. the chlorine and chlorate industry), where the used equipment is extremely sensitive, these contaminations have to be removed to a large extent.

The most common procedure for dealing with the problems mentioned above is to purify the raw brine before it is fed to the evaporation plant. Typically, however, brine purification does not remove or diminish the contamination of K and Br.

Furthermore, as a result of brine purification carbon dioxide, bicarbonate, and carbonate will be present in the purified brine. During evaporative crystallization in conventional evaporators (multiple-effect or vapour recompression units, usually operated at elevated temperature) $CaSO_4.xH_2O$, $SrCO_3$, and $CaCO_3$ scaling can be formed, especially at the surface of the heat exchangers. As a result of this scaling, the production capacity of the salt plant decreases with time, as does the energy efficiency of the process. After a production period that is typical for the quantity of contaminations in the aqueous solution and for the set-up of the conventional process, the evaporation unit needs to be cleaned, so the availability of the salt plant is also reduced.

As the current technology needs substantial amounts of energy and the energy prices have increased significantly over time, there is need for a sodium chloride production process where less energy is used.

Avram et al. in "Technologies for eutectic freeze crystallization", *Rev. Chim.*, Vol. 55 (10), 2004, pp. 769-772 disclose eutectic freeze crystallization as a technique to separate an aqueous solution into ice and a solidified solution. It is mentioned that eutectic freeze crystallization is mainly applicable in the treatment of waste water containing inorganic salts.

Habib and Farid in "Heat transfer and operating conditions for freeze concentration in a liquid-solid fluidized bed heat exchanger", *Chemical Engineering and Processing*, Vol. 45, 2006, pp. 698-710 disclose a freeze concentration process wherein liquids are concentrated by freezing out water. More particularly, they disclose subjecting an aqueous solution comprising 8 wt % of NaCl or less to a cooling step inside a single tube fluidized bed heat exchanger to form ice. Via this process a concentrate rich in its solutes is prepared.

U.S. Pat. No. 3,779,030 relates to a method of making a sodium chloride concentrate from seawater. In col. 1, lines 59-67, the principle of eutectic freezing is explained. However, ice crystals are produced to provide a supply of fresh water and seawater is only being concentrated via this method.

The salt solutions mentioned in these documents are suitable for the formation of ice, which would for example be valuable in areas with a shortage of potable water. However, these solutions are not suitable for the large-scale production of sodium chloride. Large volumes of ice will be formed and concentration of these salt solutions by evaporation is too expensive.

Stepakoff et al. in *Desalination*, Vol. 14, 1974, pp. 25-38 discloses a process involving continuously freezing brine in a stirred tank freezer by direct contact with an immiscible refrigerant until the eutectic temperature is reached. More particularly, the brine is cooled by direct cooling with Freon R-114 so that at −6° F. five phases coexist: viz. ice, brine, dihydrate, liquid Freon, and Freon vapour. It mentions that such a eutectic freezing process will make a major contribution to the problem of waste disposal, be it for industrial effluents or brackish waters. However, the feed streams used by Stepakoff et al. as well as the described method of eutectic freezing are not suitable for application in a large-scale production of sodium chloride.

The objective of the present invention is to provide a sodium chloride production process which can be performed on an industrial scale and which is less energy-consuming than the conventional evaporation salt production processes, while still resulting in the desired sodium chloride purity.

Surprisingly, it was found that this objective was realized by producing sodium chloride via a specific eutectic freeze crystallization process. In more detail, the sodium chloride production process according to the present invention comprises the steps of (i) preparing a brine comprising at least 150 g/l of sodium chloride by dissolving a sodium chloride source in water, (ii) subjecting the resulting brine to a eutectic freeze crystallization step by indirect cooling of said brine resulting in the formation of ice, sodium chloride dihydrate, and a mother liquor, and (iii) separating the sodium chloride dihydrate formed in step (ii) from the ice and optionally mother liquor at the eutectic temperature, such that a sodium chloride dihydrate-rich stream is formed, and (iv) feeding the sodium chloride dihydrate to a recrystallizer to form sodium chloride and a mother liquor.

The process according to the present invention is less energy-consuming than the conventional evaporation processes. The main reduction in energy comes from the difference in heat of crystallization compared to heat of evaporation even when multiple use of steam is applied. Furthermore, with the present process it is no longer necessary to purify the raw brine prior to the crystallization step. More particularly, in conventional production methods where sodium chloride is produced from a brine via evaporation of water, slightly soluble solid waste products like $Mg(OH)_2$, $CaSO_4 \cdot xH_2O$, $SrCO_3$, and $CaCO_3$ have to be crystallized from the raw brine first and subsequently discarded. If this purification treatment were not performed, the sodium chloride produced in the crystallization step by evaporation of water would be severely contaminated with Mg, Ca, and Sr in some form. This purification treatment is superfluous in the process according to this invention. After subjecting an unpurified raw brine to a crystallization step to produce sodium chloride dihydrate, followed by a recrystallization step, a similar or even higher sodium chloride purity is obtained as compared to the salt purity of sodium chloride that would be obtained from the same brine but using a conventional evaporation process including said brine purification step. Furthermore, particularly the contamination of K and Br in the final sodium chloride product produced via the process of the present invention is strongly reduced, since the concentration of K and Br is not affected by the conventional brine purification processes. Advantages of the new process are therefore that the produced sodium chloride contains lower K and Br levels and that the purge of sludges of $Mg(OH)_2$, $CaSO_4 \cdot xH_2O$, $SrCO_3$, and $CaCO_3$ is avoided.

With the process according to the present invention, all impurities present in raw brine can be restored in the caverns, and investment nor maintenance, nor costs of purifying chemicals, nor manpower for brine purification is required. Moreover, as the new eutectic freeze crystallization process is a low-temperature process, less corrosion is to be expected and cheaper construction materials can be applied.

BRIEF DESCRIPTION OF THE DRAWINGS

The FIGURE shows the temperature versus composition graph for the sodium chloride-water system.

The process will now be explained in more detail. In a first step, a brine is prepared by dissolving a sodium chloride source in water in a dissolver or in a subterraneous salt deposit (cavern).

It is noted that the term "sodium chloride source" as used throughout this document is meant to denominate all salt sources of which more than 50 wt % is NaCl. Preferably, such salt contains more than 75 wt % NaCl. More preferably, the salt contains more than 85 wt % NaCl, while a salt containing more than 90 wt % NaCl is most preferred. The salt may be solar salt (salt obtained by evaporating water from brine using solar heat), rock salt, or a subterraneous salt deposit. Preferably, the salt source is a subterraneous salt deposit exploited by means of solution mining.

For the water in the present process, any water supply normally used in conventional salt crystallization processes can be employed, for instance water from surface water sources, groundwater, or potable water.

The brine prepared in the first step of the process of the present invention comprises at least 150 g/l of sodium chloride, preferably at least 200 g/l, more preferably at least 250 g/l, and even more preferably at least 300 g/l. Most preferred is an almost saturated sodium chloride solution, which generally comprises approximately 310 g/l of sodium chloride. An almost saturated sodium chloride solution is meant to denote a sodium chloride solution which can be prepared from a saturated sodium chloride solution by adding just enough water for undesired incrustations on the equipment during the process to be avoided. Usually, it is sufficient to add between 0.5-1.5 wt % of water to a saturated brine solution.

In a second step, the thus obtained brine is subjected to a eutectic freeze crystallization step where the brine is cooled by indirect cooling, resulting in the formation of ice, sodium chloride dihydrate, and a mother liquor.

A "eutectic mixture" or "eutectic" is defined as a mixture of certain components in such proportions that the melting point is as low as possible and that, furthermore, these components will crystallize from solution simultaneously at this temperature. The temperature and the composition at which crystallization of a eutectic mixture takes place is called the "eutectic point". A pure aqueous sodium chloride solution has a eutectic point at −21.12° C. and 23.31 wt % sodium chloride (Dale W. Kaufmann, *Sodium Chloride, The Production and Properties of Salt and Brine*, Hafner Publishing Company, New York, 1968, p. 547). In this respect reference is also made to FIG. 1. It is noted that impurities in brine will influence the temperature and/or the composition at which crystallization of a eutectic mixture takes place (also sometimes denoted as the eutectic point).

By the term "eutectic freeze crystallization" as used throughout this description is meant subjecting a brine to a temperature lowering step until the eutectic temperature is reached and ice and sodium chloride dihydrate are formed. Starting from an unsaturated pure NaCl brine, three composition areas can be distinguished:

1. 0-23.31 wt % of sodium chloride
2. 23.31-26.29 wt % of sodium chloride
3. ≥26.29 wt % of sodium chloride—a saturated sodium chloride solution Cooling 0-23.31 wt % of unsaturated brine yields ice at some temperature between 0° C. and −21.12° C. As pure water in the form of ice is removed from the system, the remaining brine will become more concentrated. Further cooling will yield more ice and brine that is more concentrated still. Finally, at −21.12° C., the eutectic point is reached; besides ice, sodium dihydrate is formed, and, eventually, the entire brine becomes solid if sufficient heat is withdrawn. Cooling 23.31-26.29 wt % of unsaturated brine yields dihydrate at some temperature between 0.10° C. and −21.12° C. As pure dihydrate (that contains more (~62 wt %) NaCl than the brine) is formed in the system, the remaining brine will become less concentrated. Further cooling will yield more dihydrate and, consequently, the brine becomes even less concentrated. Finally, at −21.12° C., the eutectic is reached again; besides sodium chloride dihydrate, ice is formed, and, eventually, the entire brine becomes solid if sufficient heat is withdrawn.

Cooling saturated brine with a sodium chloride concentration greater than or equal to 26.29 wt %, depending on the temperature, first yields some anhydrous NaCl (the normal salt) and a slightly less concentrated brine until 0.10° C. is reached. At this temperature the anhydrate (NaCl) just crystallized will convert to dihydrate. Subsequently, the process as described above for cooling a 23.31-26.29 wt % aqueous sodium chloride solution will take place.

It is noted that the above temperatures are for pure brine. If impurities are present in the brine, these temperatures may be slightly different.

Cooling brine according to the present invention until ice, sodium chloride dihydrate, and a mother liquor are obtained, is effected by indirect cooling. The term "cooling" is meant to denote not only a lowering of the temperature until the eutectic temperature is reached, but also the withdrawal of heat at the eutectic temperature. By the term "indirect cooling" is meant that use is made of cooling means where a cooling medium (e.g. one or more refrigerants, such as ammonia, butane, carbon dioxide or Freon, or other cooling media such as an ethylene glycol/water mixture, a calcium chloride/water mixture, a potassium formate/water mixture, Alkyl Substituted Aromatics (e.g. Dowtherm J ex Dow Chemical Company)) is not in direct contact with the brine. More specifically, the cooling medium is contained in a closed circuit and the brine to be cooled is physically totally separated from the cooling medium by a solid (e.g. tube) wall.

Indirect cooling is used because in that case contamination of the produced sodium chloride with traces of the cooling medium is completely prevented. Indirect cooling of the brine is achieved either via an evaporating falling film (i.e. a refrigerant) or via a closed circuit with a cooling medium (i.e. a liquid without phase change at heat exchanging). If indirect cooling is achieved with a cooling medium, said cooling medium is cooled using a refrigerant. It subsequently releases its cold to the brine via a solid wall, and it is recycled to be cooled again using said refrigerant.

When using indirect cooling, ice and/or sodium dihydrate have a strong tendency to deposit on the heat exchanging surfaces. Furthermore, any other components present in the brine may form incrustations on these surfaces. Said cooling step is therefore preferably performed in a vessel equipped with means to prevent scaling of ice, sodium chloride dihydrate and/or any other components on the heat exchanging surfaces. For this purpose any conventional vessel known in the art to prevent scaling can be used. A suitable example is a vessel equipped with a wiper or scraper to keep these surfaces sufficiently free of deposits (i.e. a scraped cooled wall crystallizer). Most preferably, the cooling step is performed in a self-cleaning fluidized bed heat exchanger/crystallizer. By the term "self-cleaning fluidized bed heat exchanger/crystallizer" is meant a vertical shell-and-tube heat exchanger. In the tubes of the heat exchanger a fluidized bed of steel particles (in the process stream) is maintained. A clear advantage of a fluidized bed heat exchanger/crystallizer is that it comprises considerably fewer mechanical parts than a scraped cooled wall crystallizer, thus making it less expensive than a scraped cooled wall crystallizer. Especially for large-scale production this represents a considerable saving in costs. Further, a fluidized bed heat exchanger/crystallizer has increased operational reliability compared to scraped cooled wall crystallizers. Also, the significantly higher heat transfer rates routinely obtained in a fluidized bed heat exchanger compared to conventional heat transfer equipment lead to substantial size reduction of the heat transfer equipment at a given duty. Also, the start-up and control are comparatively easy. Said fluidized bed crystallizer may be equipped with additional means to keep the walls free of deposits.

The cooling step is preferably carried out at a pressure of at least 0.3 bar, preferably at least 0.5 bar, and most preferably at least 0.7 bar. Preferably, the pressure is not higher than 7 bar and more preferably not higher than 5 bar. Most preferably, the process is carried out at atmospheric pressure only increased with static pressure and dynamic pressure imposed by a circulation pump.

In one embodiment of the present invention, a first cooling step of the raw brine to about 0° C. is performed in a conventional way. More particularly, cooling to about 0° C. can be performed in a fluidized bed heat exchanger/crystallizer, but it is more preferred to perform this step in a conventional heat exchanger such as a shell-and-tube heat exchanger or a plate heat exchanger.

Subsequently, the cooled raw brine may be mixed with recycled crystal slurry (i.e. sodium dihydrate and/or ice crystals) or clear mother liquor obtained from step (ii), typically of about −21° C., to control the slurry density and/or the degree of concentration of the mother liquor. The cooled brine, optionally comprising sodium dihydrate and/or ice crystals, will subsequently be cooled further in a fluidized bed heat exchanger/crystallizer to the eutectic temperature, typically about −21° C. (vide infra), while crystallizing sodium chloride dihydrate (if the initial raw brine contains more sodium chloride than is present in the eutectic mixture) or ice (if the initial raw brine contains less sodium chloride than is present in the eutectic mixture). Next, at the eutectic temperature sodium chloride dihydrate and ice are simultaneously crystallized at a fixed ratio, at a rate wholly determined by the amount of heat that can be transferred through the heat exchanger wall. Heat exchange conditions are preferably chosen such that the slurry density generated by sodium chloride dihydrate and ice does not disturb the correct functioning of the fluidized bed heat exchanger/crystallizer.

In a step (iii), the sodium chloride dihydrate formed in step (ii) of the process according to the present invention is separated from formed ice and optionally mother liquor at the eutectic temperature (typically about −21° C.), using conventional means. Typically a sodium chloride dihydrate-rich stream is thus formed. This separation step takes place during and/or after the eutectic freeze crystallization step. It is noted that unlike sodium chloride dihydrate, ice floats in brine. Hence, preferably ice and sodium chloride dihydrate are separated by any separation method known in the art based on gravity or centrifugal forces. Typically in such a separation process a dihydrate-rich stream is formed, and preferably also an ice-rich stream is formed. By the term "dihydrate-rich stream" is meant a stream containing more than 50 wt % of all the sodium dihydrate present in the stream prior to its being subjected to said separation step. An ice-rich stream contains more than 50 wt % of all the ice present in the stream prior to separation.

Separation of the formed ice, mother liquor, and sodium chloride dihydrate is preferably performed using one or more cyclones, one or more decanters, or one or more separation vessels in which ice will float to the top and sodium chloride dihydrate will sink to the bottom, optionally combined with one or more centrifuges or filters.

Ice formed in the process of the present invention may be purified. This can be done by any conventional means but preferably by a wash column in which water (melted ice) is used countercurrently as wash liquid. The ice may subsequently be melted. Preferably, a part is recycled as wash liquid to the wash column. The cold generated by the melting step can be used to precool fresh raw brine and/or refrigerants.

An additional energy saving option is not to separate the ice from the mother liquor. By melting the ice in the mother liquor at sub-zero temperatures, the cold generated can be used to cool fresh raw brine and/or to condensate refrigerants to/at sub-zero temperatures.

The sodium chloride dihydrate-rich stream obtained by separation of the mixture resulting from eutectic freeze crystallization step (ii), comprising ice, sodium chloride dihydrate, and mother liquor, may be purified before it is subjected to recrystallization step (iv). It may be purified by any conventional means, but preferably it is purified using a wash column in which, preferably, mother liquor obtained from the recrystallization step is used countercurrently as wash liquid.

In a next step optionally purified sodium chloride dihydrate is fed to a recrystallizer to form sodium chloride and mother liquor (step (iv) of the present process). Preferably, the recrystallization conditions are chosen such that the standard particle size distribution of standard unsieved vacuum salt is produced (i.e. the crystals have such a particle size distribution that they will be retained on a sieve of about 100 µm but will pass a sieve of 1,000 µm). Limited agitation and small temperature differences with respect to the transition of sodium chloride dihydrate to sodium chloride (0.1° C.) will produce the desired particle size distribution. Preferably, recrystallization is executed in plug flow to have the recrystallization completely finished at the exit of the recrystallization section.

Plug flow may also be mimicked by a number of recrystallizers in series, e.g. continuous mixed-suspension, mixed-product removal (CMSMPR) recrystallizers. More preferred is a combination of a wash column and a crystallizer in one wash/recrystallization step. The salt resulting from the recrystallization is separated from the mother liquor by any conventional means, preferably hydrocyclones and centrifuges, and optionally processed further. As mentioned, the mother liquor may subsequently be partly recycled as wash liquid to the wash column.

In the preferred embodiment where brine is prepared by dissolving a sodium chloride source in water in a subterraneous salt deposit (cavern), mother liquor obtained in the cooling step and/or mother liquor obtained in the recrystallization step of the sodium chloride dihydrate are recycled at least in part to the first step, i.e. to the step where raw brine is prepared by dissolving a salt source in water. Preferably, either at least 50% of the mother liquor obtained in the cooling step, more preferably, at least 75% of this mother liquor, is recycled to the first step, or at least 50% of the mother liquor obtained in the recrystallization step of the sodium chloride dihydrate, more preferably, at least 75% of this mother liquor, is recycled to the first step. Even more preferably, at least 50%, and most preferably, at least 75% of both the mother liquor obtained in the cooling step and the mother liquor obtained in the recrystallization step is recycled to the first step. Total recycling of both the mother liquor from the cooling step and the mother liquor from the recrystallization to the subterraneous salt deposit will return all impurities to their origin without discharge to the environment. Of course, as a consequence the quality of the raw brine will be substantially worse than without such recycle. Surprisingly, however, it was found that the quality of said raw brine remains sufficient to produce high-quality salt, as the crystallization of sodium chloride dihydrate functions as an additional and sufficient purification step. This is in contrast to the present evaporation processes where, for quality reasons, recycling of mother liquors to raw brine production caverns is avoided as much as possible to keep the impurity concentrations in raw brine at the lowest possible concentration.

Contaminations in raw aqueous sodium chloride solutions prepared from a natural source almost always include sulphate ions. The presence of sulphate ions may have an adverse effect on the eutectic freeze crystallization step or on the recrystallization step. Therefore, it is preferred that if more than 0.08 wt % of sulphate ions are present in the brine prepared by dissolving a sodium chloride source in water, measures are taken to avoid sodium chloride with a too high sulphate concentration being produced. More particularly, when cooling a brine comprising sulphate ions, eventually solid $Na_2SO_4 \cdot 10H_2O$, hereinafter also denoted as Glauber salt, will be formed. The solubility of Glauber salt diminishes rapidly with decreasing temperature. As a result, at the eutectic, Glauber salt will have crystallized out of the solution, just like sodium chloride dihydrate. Hence, if more than 0.08 wt % of sulphate ions are present in the brine prepared by dissolving a sodium chloride solution in water such that the concentration of NaCl is at least 150 g/l, said brine is preferably cooled to a temperature between 0 and −15° C. prior to the eutectic freeze crystallization step. This cooling step will result in the formation of Glauber salt, some ice or some sodium chloride dihydrate, and a mother liquor. Any Glauber salt and other solids that have precipitated with these treatments are preferably removed from the brine by a conventional solid/liquid separation step, such as filtration or, more preferably, using a hydrocyclone. Subsequently, the resulting brine is subjected to the eutectic freeze crystallization step by indirect cooling of said brine, resulting in the formation of ice, sodium chloride dihydrate, and a mother liquor, and the sodium chloride dihydrate is fed to a recrystallizer to form sodium chloride and a mother liquor as described above. This additional process step is even more preferred if more than 0.82 wt % of sulphate ions are present in the brine prepared in step (i), and is most preferred if more than 1.2 wt % of sulphate ions are present in the brine prepared in step (i) of the present process.

The process according to the present invention is further illustrated by the following examples.

EXAMPLE 1

In a stirred jacketed glass vessel, about 1,800 g of a 25 wt % NaCl solution (i.e. a NaCl solution containing 300 g of NaCl per liter, prepared by dissolving salt of pharma grade in demineralized water at ambient temperature) were cooled down to −20° C. The solution was indirectly cooled via a coolant (Syltherm 800, i.e. dimethyl polysiloxane) through the jacket of the glass vessel. During the cooling down sodium chloride dihydrate crystallized. The thus formed crystal slurry was cooled down further to −21.8° C., which is slightly below the eutectic temperature (−21.3° C.) of a pure aqueous sodium chloride solution. Subsequently ice started to crystallize and the temperature rapidly increased to the eutectic temperature. At this constant temperature, heat was extracted and both ice and sodium chloride dihydrate were formed.

After 15 minutes, the stirring element was switched off. A separation step was executed at the eutectic point. Due to gravity the process slurry separated into three phases: sodium chloride dihydrate on the bottom of the vessel and ice floating in saturated brine.

In the same experiment, before switching off the stirring element, a homogeneous sample of the process slurry was separated into the above-mentioned three phases as follows. The sample was subjected to a centrifuge treatment using a laboratory centrifuge (type: Hermle Z300) (tubes without filtrate discharge) at 2,700 rpm for about 10 seconds. This operation resulted in fast and clear-cut separation of sodium dihydrate and ice crystals.

EXAMPLE 2

In order to be able to estimate the purity of sodium chloride produced from raw brine via the novel sodium chloride production process, distribution ratios of impurities present in raw brine (source: Hengelo, The Netherlands) were determined for the sodium chloride dihydrate formation (step ii) and for the sodium chloride formation (step iv). The amounts of calcium, magnesium, strontium, and bromide present in the raw brine are shown in Table 1.

Distribution ratios of impurities for the sodium chloride dihydrate formation (step ii) were determined according to the following procedure. A jar with raw brine was cooled down in a freezer to a temperature of −21° C. The sodium chloride dihydrate crystals formed were separated from the mother liquor by filtration at a temperature of −21° C. Subsequently the sodium chloride dihydrate crystals were washed amply with demineralized water of 0° C. Wash water was collected separately from mother liquor. Finally, part of the sodium chloride dihydrate crystals were dissolved in demineralized water. The mass and the composition of relevant phases were determined accurately to check the mass balance and to calculate distribution ratios.

The distribution ratios of Ca, Mg, Sr, and Br were determined according to this procedure (unit: mg of component× per kg sodium chloride dihydrate crystal/mg of component× per kg mother liquor). Ca, Mg and Sr were determined via Inductively Coupled Plasma (ICP), while Br was determined via Ion Chromatography (IC).

TABLE 1

| Component | Raw Brine (mg/kg) | Mother Liquor (mg/kg) | Crystal (mg/kg) | Distribution ratio (—) |
|---|---|---|---|---|
| Ca | 1,254 | 1,330 | 41.7 | 0.031 |
| Mg | 39.4 | 42.0 | 1.40 | 0.033 |
| Sr | 16.3 | 17.1 | 0.56 | 0.033 |
| Br | 16.0 | 15.6 | 5.35 | 0.343 |

Distribution ratios of impurities for the sodium chloride formation (step iv) were determined according to the following procedure. Water was evaporated from raw brine at 30° C. and reduced pressure until a concentration factor of 1.3 was reached. The sodium chloride crystals formed were separated from the mother liquor by filtration at ambient temperature. Sodium chloride crystals were washed amply with a saturated, ultra-pure sodium chloride solution (i.e. pharma grade sodium chloride dissolved in demineralized water) to prevent crystals from dissolving. This solution was collected separately from mother liquor. The mass and the composition of relevant phases were determined accurately to check the mass balance and to calculate distribution ratios.

According to this procedure, the following distribution ratios were determined via ICP (unit: mg of component×per kg sodium chloride crystal/mg of component×per kg mother liquor):

TABLE 2

| Component | Raw Brine (mg/kg) | Mother Liquor (mg/kg) | Crystal (mg/kg) | Distribution ratio (—) |
|---|---|---|---|---|
| Ca | 1,149 | 1,555 | 18.0 | 0.0116 |
| Mg | 61.2 | 80.2 | 0.60 | 0.0075 |
| Sr | 16.3 | 21.3 | 0.25 | 0.0117 |

These distribution ratios show that a purification treatment of the raw brine is superfluous. After subjecting the unpurified raw brine to a crystallization step to produce sodium chloride dihydrate, followed by a recrystallization step, sodium chloride with high purity is obtained.

The invention claimed is:

1. A process for producing sodium chloride comprising the steps of
   (i) preparing a brine comprising at least 150 g/l of sodium chloride by dissolving a sodium chloride source in water,
   (ii) subjecting the resulting brine to a eutectic freeze crystallization step by indirect cooling of said brine, resulting in the formation of ice, sodium chloride dihydrate, and a mother liquor,
   (iii) separating the sodium chloride dihydrate formed in step (ii) from the ice at the eutectic temperature, such that a sodium chloride dihydrate-rich stream is formed, and
   (iv) feeding said sodium chloride dihydrate-rich stream to a recrystallizer to form sodium chloride and a mother liquor.

2. The process according to claim 1 wherein the brine prepared in step (i) has a NaCl concentration of at least 300 g/l.

3. The process according to claim 1 wherein mother liquor obtained in step (ii) and step (iv) is recycled to step (i).

4. The process according to claim 1 wherein step (ii) is carried out in a fluidized bed heat exchanger/crystallizer.

5. The process according to claim 1 wherein step (iii) takes place during the eutectic freeze crystallization step.

6. The process according to claim 1 wherein in step (iii) the ice, sodium dihydrate, and mother liquor are separated so that a dihydrate-rich stream and an ice-rich stream are formed.

7. The process according to claim 6 wherein the ice in the ice-rich stream is separated from the mother liquor, washed, melted, and at least in part used as wash liquid.

8. The process according to claim 6 wherein the ice in the ice-rich stream is not separated from the mother liquor but melted at sub-zero temperatures, and the cold generated is used to cool the brine prepared in step (i) and/or to condensate refrigerants to/at sub-zero temperatures.

9. The process according to claim 1 wherein brine prepared in step (i) is cooled to a temperature of between 0° C. and −15° C. and subsequently subjected to a separation step to remove any crystallized Glauber salt prior to step (ii).

10. The process according to claim 1 wherein the sodium chloride dihydrate formed in step (ii) is separated from the ice and mother liquor.

11. The process according to claim 1 wherein mother liquor obtained in step (ii) is recycled to step (i).

12. The process according to claim 1 wherein mother liquor obtained in step (iv) is recycled to step (i).

13. The process according to claim 1 wherein step (iii) takes place during and after the eutectic freeze crystallization step.

14. The process according to claim 1 wherein step (iii) takes place after the eutectic freeze crystallization step.

* * * * *